Aug. 11, 1970   J. DEBAERE   3,523,324
INSTALLATION FOR THE OUTSIDE CLEANING OF SLAUGHTERED
ANIMALS, MORE ESPECIALLY PIGS

Filed Sept. 20, 1967   4 Sheets-Sheet 1

INVENTOR.
J. Debaere
BY Richards & Geier
ATTORNEYS

INVENTOR.
J. Debaere

United States Patent Office 3,523,324
Patented Aug. 11, 1970

3,523,324
INSTALLATION FOR THE OUTSIDE CLEANING OF SLAUGHTERED ANIMALS, MORE ESPECIALLY PIGS
Julius Debaere, Staden, Belgium, assignor of one-half to Luto Gelderse Exportslachterijen N.V., Groenlo, Netherlands, a corporation of the Netherlands
Filed Sept. 20, 1967, Ser. No. 669,240
Claims priority, application Belgium, Oct. 3, 1966, 687,709
Int. Cl. A22c 17/08; A22b 5/08
U.S. Cl. 17—1                                4 Claims

ABSTRACT OF THE DISCLOSURE

Installation for the outside cleaning of slaughtered animals, and more particularly of pigs, mainly consists in the combination of at least one row of upstanding flexible means which impart a rotary motion to the pig being moved alongside thereof; at least one row of horizontally mounted elastic means which move alongside the pig in order to clean it; a conveyor which affords the possibility to move the pig between aforesaid rows of elastic means and means which spray it in an efficient way.

---

The present invention concerns an installation for cleaning and more particularly for outside cleaning of slaughtered animals especially pigs.

It is a known fact that animals and more particularly pigs after having been slaughtered and shorn, must undergo a singeing process for removing the remaining hair bristles.

This scorching is necessarily accompanied by a formation of soot on the animal, so that the latter needs cleaning after this operation. Up to the present, this cleaning is mostly carried out by scrubbing the pig with a hard brush and plenty of water.

It has already been suggested to carry out aforesaid cleaning process mechanically, but until now it has not been possible to design an appropriate machine which could reach all parts of the beast without causing any damage to its skin.

The object of the present invention therefore is to provide an installation which would be able to clean the singed pigs altogether, i.e. over the entire surface of the skin, including the body, the legs and trotters, the whole head, etc. without in the least damaging the skin.

With this object in view, the device according to the present invention mainly consists in the combinaton of the following features and parts, viz: at least one row of upright flexible means which impart a rotary motion to the pig being moved in front thereof; at least one row of horizontally mounted flexible means which move along the pig for cleaning it; a conveyor device by means of which the pig can be moved between aforesaid rows of flexible means and means which spray it in an appropriate way.

Aforesaid rows of flexible means shall preferably consist of strips of elastic material, such as rubber, mounted in an appropriate way on a shaft and which, when this shaft rotates, strikes the pig and hence act on the skin.

It is obviously preferable to fasten on one and the same shaft several rows of such rubber strips.

The conveyor shall for instance consist of a chain or suchlike contrivance which is provided at some well defined places with carrier pins, whereby the chain in question runs in a supporting tube over which can be placed the hooks onto which the pigs are suspended. Finally, next to aforesaid conveyor contrivance and on top of aforesaid row, respectively rows, of flexible elements, there is a water pipe onto which jets are fastened at regular intervals.

Preferably, there shall be at least one vertical shaft onto which several rows of rubber strips are fastened, while, opposite to said shaft, there shall be provided two superimposed horizontal shafts onto which are also mounted several rows of rubber strips. Aforesaid horizontal shafts are fitted at such height that they can practically process the entire pig.

According to the present invention, the device shall in fact also consist of two shafts which face each other horizontally and upon which also several rows of rubber strips are provided, whereby these shafts are mounted at a height above ground corresponding to the point about which the head of the pig passes between these rows of elastic elements, in order to also properly clean this part of the beast.

In order to convey a clearer understanding of the present invention, a description is given below, without implying any limiting feature however, of a preferred mode of embodiment, with reference to the appended drawings of which:

In this form of embodiment, the device mainly consists of a casing 1 of which both exits are made in such way as to afford a passage for the pigs which must respectively be cleaned and have been cleaned, and whereby the casing is mainly provided for avoiding too much splashing of the water.

In aforesaid casing, two vertical shafts 2–3 respectively are mounted, of which each one carries a pulley 4–5 respectively near its free upper end, whereby said pulleys are connected by a belt 6 which also runs over a pulley 7 keyed to the shaft of a driving motor 8.

Figure 3:
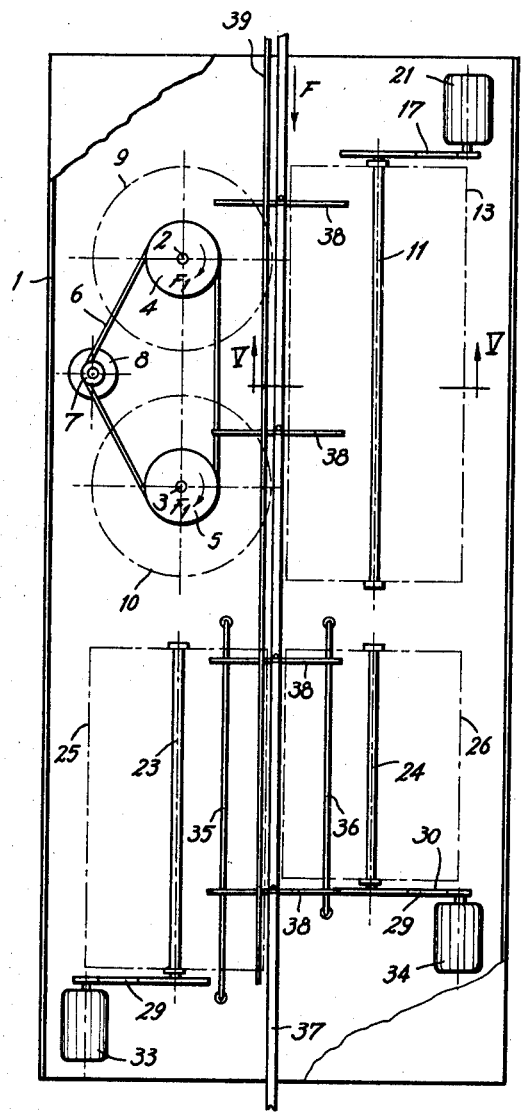
FIG. 3 is a diagrammatic top view of a device according to the present invention.
Figure 4:
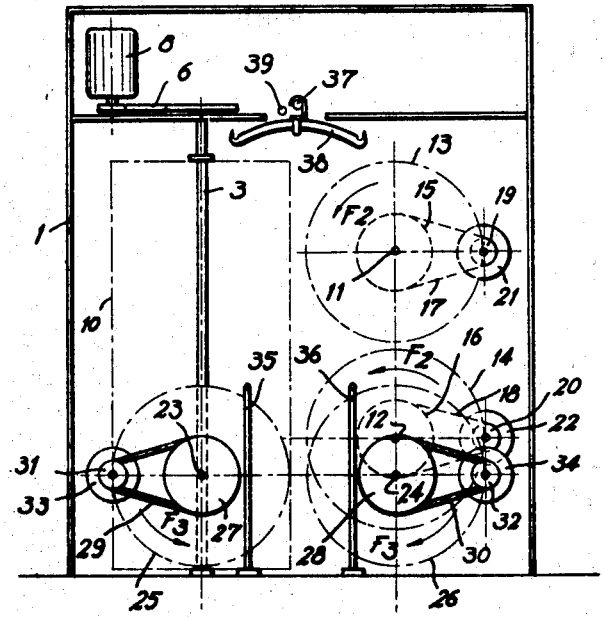
FIG. 4 is a view in the direction of arrow F4 of FIG. 3.

Aforesaid shafts 2–3 are adequately provided with elastic rubber strips which shall be described hereafter. In FIGS. 3 and 4, the lines 9 and 10 represent the limiting trajectory of the ends of aforesaid rows of rubber strips when the machine is moving, a position which is also represented in FIG. 3.

Opposite aforesaid vertical shafts 2–3, there are two horizontal shafts 11–12 respectively, whereby the latter are mounted on top of each other and, just like the shafts 2–3, are provided with elastic rubber strips of which the extreme trajectory, when the machine is operating, is illustrated by the lines 13–14 respectively. Each of the shafts 11–12 are provided with a pulley 15–16 which, by means of belts 17 and 18, are connected to pulleys 19–20 which latter are fastened to the shafts of driving motors, 21–22 respectively.

The device according to the present invention is finally completed by two horizontal shafts 23–24 respectively, of equal or unequal lengths, mounted parallel to aforesaid shafts 11–12 but opposite to each other, whereby on said shafts, as well as on the shafts mentioned before, elastic rubber strips are provided which shall be described later. In this case, aforesaid rubber strips move on an orbit which is represented by 25 respectively 26. The opposite shafts 23–24 are mounted at a level which is slightly lower than the height of aforesaid shaft 12.

Finally, on both shafts 23 and 24 pulleys 27–28 respectively are provided, which are connected by means of the belts 29–30 with pulleys 31–32 keyed onto the shafts of electric motors, 33–34 respectively.

Next to, and respectively between aforesaid horizontal shafts 23 and 24, U-shaped bent bars, 35–36 respectively, are provided at well defined distances apart, which bars can for instance be fastened with their free ends onto the floor and of which the horizontal part is placed in such way that the extremities of the rubber strips can pass freely under this part.

Finally, above the assembly, a conveyor arrangement 37, known as such, is mounted and provided at regular distances from each other with carrier devices for the displacement of hooks 38 onto which the pigs are being suspended by the hind legs in the usual way.

Apart from aforesaid conveyor, there is a water pipe 39 onto which are fastened at equal distances apart, a series of downward pointing jets 40.

Each one of aforesaid shafts 2–3–11–12–23 and 24 mainly consists of an actual shaft 41 onto which discs 42 are mounted at regular intervals, whereby these discs may for instance be kept apart by rods 43 and whereby in this case six rods are provided. Finally, the elastic rubber strips are fastened freely rotating upon aforesaid rods 43.

In this case, said elastic strips mainly consist of a cylindrical part 44 provided with an opening as will allow it to be mounted freely rotatable upon one of aforesaid rods 43, whereby with this purpose in mind, aforesaid cyclindrical part shall be provided with a (non-represented) sleeve.

Onto each of the cylindrical parts, two rubber strips 45 are provided. Nothing however prevents aforesaid body to be provided with one rubber strip 45 or even with a large row of such rubber strips.

Figure 7:
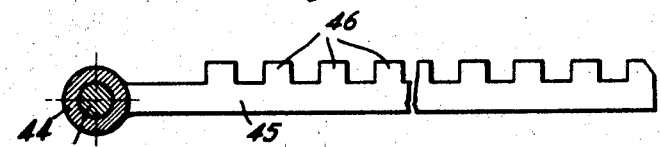
FIG. 7 is a cross-section by a plane of which the trace follows the straight line VII—VII of FIG. 6.
Figure 5:
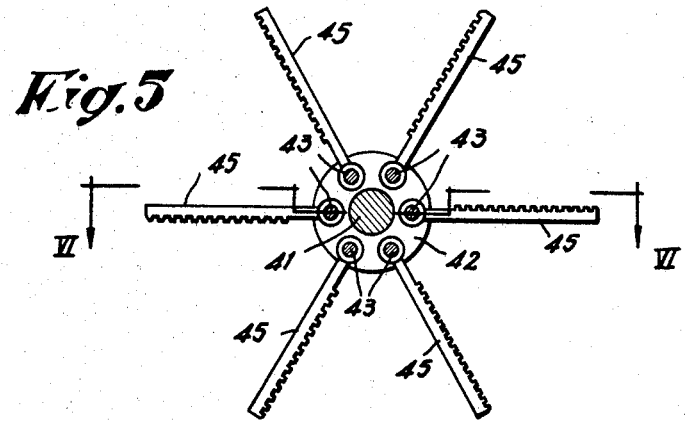
FIG. 5 is a diagrammatic cross-section by a plane of which the trace follows the straight line V—V of FIG. 3.
Figure 6:
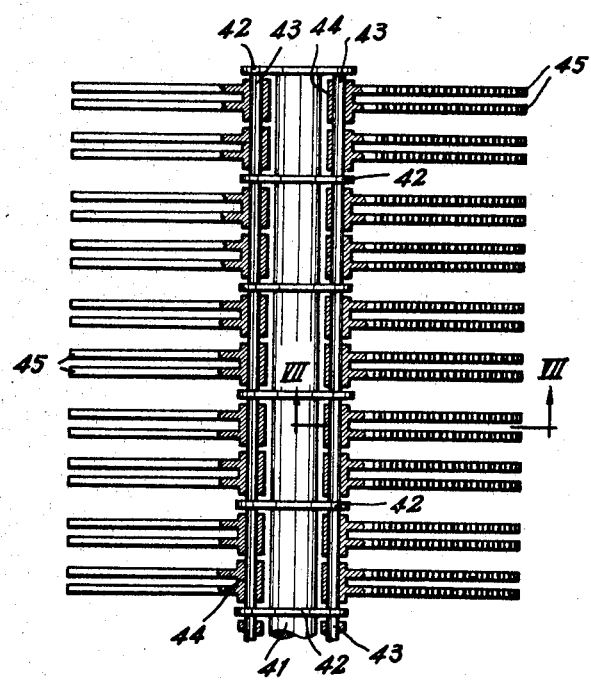
FIG. 6 is a cross-section by a plane of which the trace follows the straight line VI—VI of FIG. 5.

Each one of said elastic strips 45 is, according to the kind of embodiment illustrated in FIGS. 5 to 7, formed by a strip of comparatively flexible rubber material, whereby this strip is provided with rectangular or square projections 46.

Figure 8:
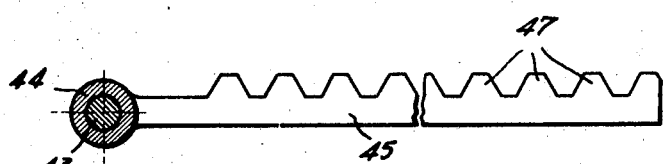
FIGS. 8 and 9 illustrate two variants of the rubber strips as illustrated in FIG. 7.
Figure 9:
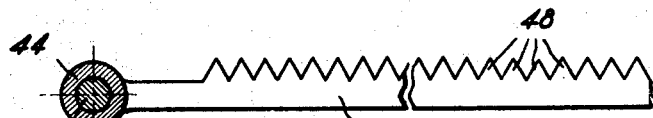

In the embodiment according to FIG. 8, a variant is shown in which the rubber strip 44 is provided with a trapezoid-shaped projection 47, while in the embodiment according to FIG. 9, the rubber strip 45 is provided with a triangular projection 48.

The use and operation of the present invention are extremely simple, as will now be shown.

Figure 2:
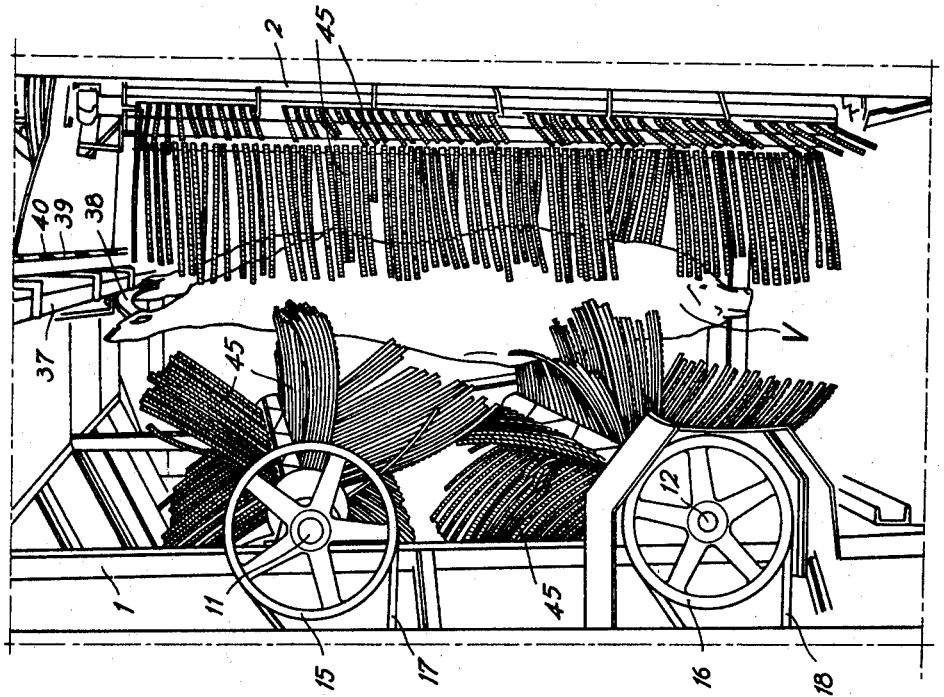
FIG. 2 is a similar view to that of FIG. 1, but with the device shown in action, whereby the pigs travel along and between aforesaid row or rows of elastic elements.
Figure 1:
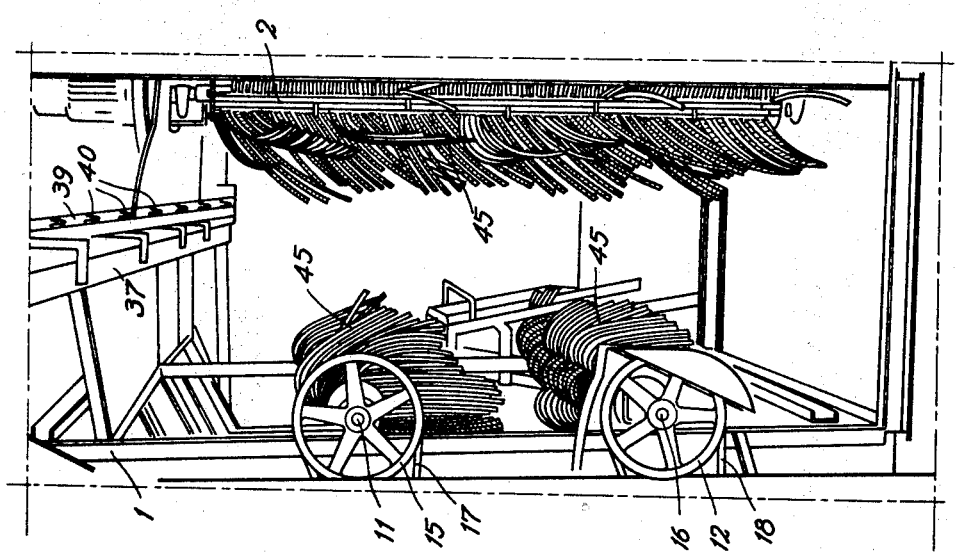
FIG. 1 is a partially perspective view of the device according to the present invention, whereby the latter is shown at rest.

The machine which is represented at standstill in FIG. 1, whereby it is clearly indicated that the flexible rubber strips hang freely downward, is set going by switching on the electric motors 8–21–22–33 and 34, whereby aforesaid sets of rubber strips are set into rotary motion and take up radial positions over aforesaid corresponding shafts, on account of the fact that they are mounted free to rotate on the rods 42.

The pigs V which are suspended on aforesaid hooks 38, move in the direction of arrow F between aforesaid rows of rubber strips.

The rubber strips 44 in question which are fastened to the shafts 2 and 3, rotate as shown by the arrows $F_1$, whereby these vertical rows of rubber strips impart a rotary motion to the pig.

While the latter is thus rotated fairly slowly by being acted upon by the rows of rubber strips fastened onto the shafts 2 and 3, it is at the same time subjected to the action of the rubber strips 45 which are mounted upon the shafts 11 and 12. These are fitted at such height with respect to the normal length of pigs that the rubber strips 45 on the shafts 11 and 12 reach practically over the entire length thereof.

It is obvious that during the cleaning operation of the pig, plenty of water is being sprayed onto it by aforesaid jets 40.

The rotation of aforesaid shafts 11 and 12 takes place according to the arrows $F_2$, i.e. is directed downward onto the place where the rubber strips 45 come into contact with the pig.

Hence, when the pig which is cleaned moves forward, it passes between the shafts 23 and 24 where it is being led between aforesaid rods 35 and 36.

The rubber strips which are provided on the shafts 23 and 24 act at this time exclusively upon the head with the object of cleaning the latter altogether on the outside.

In this case, the motion of the rubber strips 45 mounted upon shafts 23 and 34 is directed upward at the location of the pig, according to the arrow $F_3$.

In all cases, the rubber strips 45 are mounted in such way upon their corresponding rods 43 that the projections 46–47 or 48 respectively, are placed according to the direction of these shafts, i.e. in such way that said projections are the parts which actually strike the pig.

In this way an installation is obtained by means of which pigs can be cleaned outside in a very efficient way without their skin undergoing any damage and without intervention of labour, except for setting the machine going.

It is obvious that the installation according to the present invention is not in any way limited either as a whole or with respect to its constituent parts to the features and particulars which have been described above and illustrated in the appended drawings. Both the installation as such and the constituent parts, and more especially the rubber strips and their fastening, can be constructed in all kinds of shapes and dimensions without exceeding the scope of the present invention.

What I claim is:

1. A carcass cleaning machine, comprising a casing having an elongated passage for the carcasses, a movable horizontal conveyor mounted upon said casing for conveying carcasses suspended therefrom through said passage, a horizontal pipe mounted upon said casing adjacent said conveyor and having water-spraying jets directed toward the carcasses carried by said conveyor, at least one vertical shaft mounted to one side of said passage, a plurality of elastic scraper elements, means rotatably mounting said scraper elements upon said vertical shaft in superposed planes perpendicular to said vertical shaft, at least one horizontal shaft mounted to the opposite side of said passage, a plurality of other elastic scraper elements, and means rotatably mounting said other elastic scraper elements upon said horizontal shaft in parallel planes perpendicular to said horizontal shaft, said first-mentioned and second-mentioned elastic elements facing each other and, when rotated, extending into said passage and being adapted to engage carcasses moving through said passage.

2. A machine in accordance with claim 1, wherein the first-mentioned means rotate the first-mentioned elastic scraper elements in a direction in which they exert a horizontal and forwardly directed force upon the carcasses in the direction of movement of said conveyor and wherein the second-mentioned means rotate the second-mentioned elastic scraper elements in a direction in which they exert a vertical and downwardly directed force upon the carcasses in a direction away from said conveyor.

3. A machine in accordance with claim 1, comprising two additional horizontal shafts facing each other and mounted on opposite sides of said passage on a level lower than that of the first-mentioned horizontal shaft and in front of the first-mentioned horizontal shaft and said vertical shaft in relation to the direction of movement of said conveyor, additional pluralities of elastic scraper elements and means rotatably mounting said additional pluralities of elastic scraper elements upon said additional horizontal shafts in planes perpendicular to said additional horizontal shafts.

4. A machine in accordance with claim 3, wherein the last-mentioned means rotate said additional pluralities of elastic scraper elements in a direction toward said conveyor in which they exert upwardly directed forces upon the carcasses.

References Cited

UNITED STATES PATENTS

| | | | |
|---|---|---|---|
| 554,707 | 2/1896 | Michner | 17—1 X |
| 1,617,002 | 2/1927 | Zerbe | 17—14 |
| 2,641,796 | 6/1953 | Johnson | 17—11.1 |
| 3,119,145 | 1/1964 | Weprin | 17—14 X |

LUCIE H. LAUDENSLAGER, Primary Examiner

U.S. Cl. X.R.

17—14